United States Patent [19]

Traut

[11] 4,224,147

[45] Sep. 23, 1980

[54] FILTER APPARATUS FOR REMOVING CONTAMINANTS FROM A FLUID STREAM HAVING IMPROVED WITHDRAWAL MEANS FOR SPENT ADSORBENT

[75] Inventor: Donald P. Traut, Arvada, Colo.

[73] Assignee: Helix Technology Corporation, Waltham, Mass.

[21] Appl. No.: 904,650

[22] Filed: May 10, 1978

[51] Int. Cl.[2] .............................................. B01D 23/20

[52] U.S. Cl. .................................... 210/660; 210/264; 210/268; 55/387; 55/479

[58] Field of Search ................. 210/33, 189, 264, 268, 210/269, 80, 24; 55/387, 431, 479, 484

[56] References Cited

U.S. PATENT DOCUMENTS

| | | | |
|---|---|---|---|
| 329,305 | 10/1885 | Gaunt | 210/268 |
| 335,603 | 2/1886 | Matthiessen | 210/268 |
| 1,031,886 | 7/1912 | Suykerbuyk | 210/264 |
| 2,678,108 | 5/1954 | Reid | 55/479 X |
| 3,270,886 | 9/1966 | Sackett | 210/268 X |
| 3,881,899 | 5/1975 | Spulgis | 55/387 |
| 3,925,046 | 12/1975 | Hickey et al. | 55/387 |

*Primary Examiner*—Thomas G. Wyse
*Attorney, Agent, or Firm*—Hamilton, Brook, Smith and Reynolds

[57] ABSTRACT

An improved withdrawal means for removing spent adsorbent from the adsorber beds of a filter apparatus is disclosed comprising a fixed tube and a rotatable tube positioned concentrically and having a different pattern of slots through each so that a different portion of the slots in each come into an aligned relationship as the rotatable tube is rotated so that spent adsorbent can be pneumatically removed from zones where the slots are aligned. This withdrawal means allows the external selection of adsorbent withdrawal zones, which is especially important in filter apparatus used to filter fluids containing radioactive contaminants.

8 Claims, 7 Drawing Figures

FILTER APPARATUS FOR REMOVING CONTAMINANTS FROM A FLUID STREAM HAVING IMPROVED WITHDRAWAL MEANS FOR SPENT ADSORBENT

BACKGROUND OF THE INVENTION

1. Field of the Invention

This invention relates to filtration apparatus of the type which has a plurality of adsorber beds used to adsorptively filter contaminants from a fluid stream.

2. Description of the Prior Art

Filtration systems have been employed to remove radioactively-contaminated materials, such as radioactive iodine, from off-gases emanating from nuclear installations. Such filtration systems typically employ a plurality of adsorber beds which are filled with a solid, particulate adsorbent, such as granulated charcoal. In such systems, withdrawal of spent adsorbent has presented a serious problem, either because of the hazards presented with some prior withdrawal systems or because of the inefficient use, and therefore increased expense, of other systems which require the accumulation of inordinately large volumes of spent adsorbent which is not useful in the filtration process.

Because of the unique problems presented in handling radioactively contaminated adsorbent, pneumatic discharge apparatus typically employed in other arts has not been successfully used to empty spent adsorbent from filtration beds for nuclear off-gases. The two systems shown in U.S. Pat. Nos. 3,583,768 and Re 27,471 for emptying railway hopper cars are typical.

It is, of course, theoretically possible to use one point of withdrawal at the bottom of a filter apparatus having a plurality of adsorber beds. This could be done by using a cone-shaped withdrawal hopper located immediately below the adsorber beds. Such a system, however, would be prohibitively large and uneconomical because it would require an inordinately large volume of charcoal to accumulate at a location where it was not useful. Additionally, there would be a significant increase in the initial capital cost necessitated by the fabrication of such a large hopper.

The use of multiple cone- or trough-shaped withdrawal hoppers has also been suggested, but this also results in an inordinate accumulation of adsorbent and can also increase the possibility of accidental spillage or hazard to the operator.

Alternatively, filters can be fabricated with sloping walls so that spent charcoal naturally spills over into a collection trough, such as that described and shown in U.S. Pat. No. 3,795,090. This can limit the design freedom, however, and can also mean that fabrication will be more complex and more costly if the walls are limited to such a sloped configuration.

A withdrawal device which has been widely used is an externally inserted vacuum tube. This presents a severe hazard, however, because the vacuum tube can become radioactively contaminated after minimum usage. Accidental spillage of radioactive adsorbent is also possible as the probe is inserted and removed. Additionally, when the service space is limited, the use of a vacuum tube long enough to withdraw spent adsorbent from the entire length of a filter is often impossible. In such instances, two or more units have to be joined, which inordinately increases the probability of a problem in withdrawal of radioactive adsorbent.

Two more recently developed systems for withdrawing spent adsorbent from filtration systems without the necessity of inserting a probe have been described in the patent literature. In U.S. Pat. No. 3,881,899, a withdrawal apparatus having a projecting downspout into which spent adsorbent can fall is used in conjunction with a pneumatic conveying system. U.S. Pat. No. 3,925,046 discloses a pneumatic conveying system also, but in this case, the spent adsorbent is sucked up into an inverted cup member. Both of these systems have the disadvantages of requiring multiple outlets and excessive distance below the adsorber beds for large adsorber units, resulting in more costly construction and larger volumes of unused adsorbent.

SUMMARY OF THE INVENTION

This invention relates to filter apparatus for adsorptively removing contaminants from a fluid stream, such as an off-gas stream from a nuclear power plant. The filter apparatus has a plurality of adsorber beds each containing solid particulate adsorbent, such as granulated charcoal. The adsorber beds are contained in an outer housing and are provided with a fluid inlet and a fluid outlet so that the contaminated fluid stream can be passed through these beds.

The filter apparatus described herein has an improved withdrawal means for spent adsorbent. In this improved withdrawal means, a fixed tube is provided which extends through the outer housing of the filter apparatus and along the bottom of the adsorber beds. This fixed tube is provided with a pattern of openings therein, such as a series of elongated slots uniformly spaced in a straight line relationship.

A rotatable tube is positioned concentrically with the fixed tube, and the rotatable tube has a second pattern of elongated slots staggered around the periphery of the rotatable tube.

The respective patterns of openings on the fixed and rotatable tubes are designed to cooperate so that one or more, but not all, of the openings on each come into an aligned relationship as the rotatable tube is rotated. By this means, any pre-selected zone of adsorbent can be independently pneumatically emptied by rotating the rotatable tube until the respective openings in that zone are aligned. The rotatable tube can be positioned within the fixed tube or outside the fixed tube.

Means are also provided for rotating the rotatable tube to align at least one of its holes with at least one hole in the fixed tube. A convenient means, in this regard, is a handle extending through the filter housing so that the rotatable tube can be rotated from a location external to the filter.

The improved withdrawal means described herein allows the external selection of various withdrawal zones. Thus, an entire filter apparatus may be emptied, zone by zone, from one withdrawal point without the hazards associated with other systems. In addition, neither the requirement for building up an inordinate volume of unused adsorbent nor the requirement for more costly construction are present.

This withdrawal system also has the advantage of providing the capability to select a given zone for adsorbent withdrawal without disturbing adsorbent in other zones. Thus, selective withdrawal from one or more zones is possible.

DESCRIPTION OF PREFERRED EMBODIMENTS

This invention will now be described in more detail by reference to the aforementioned Figures.

Figure 1:
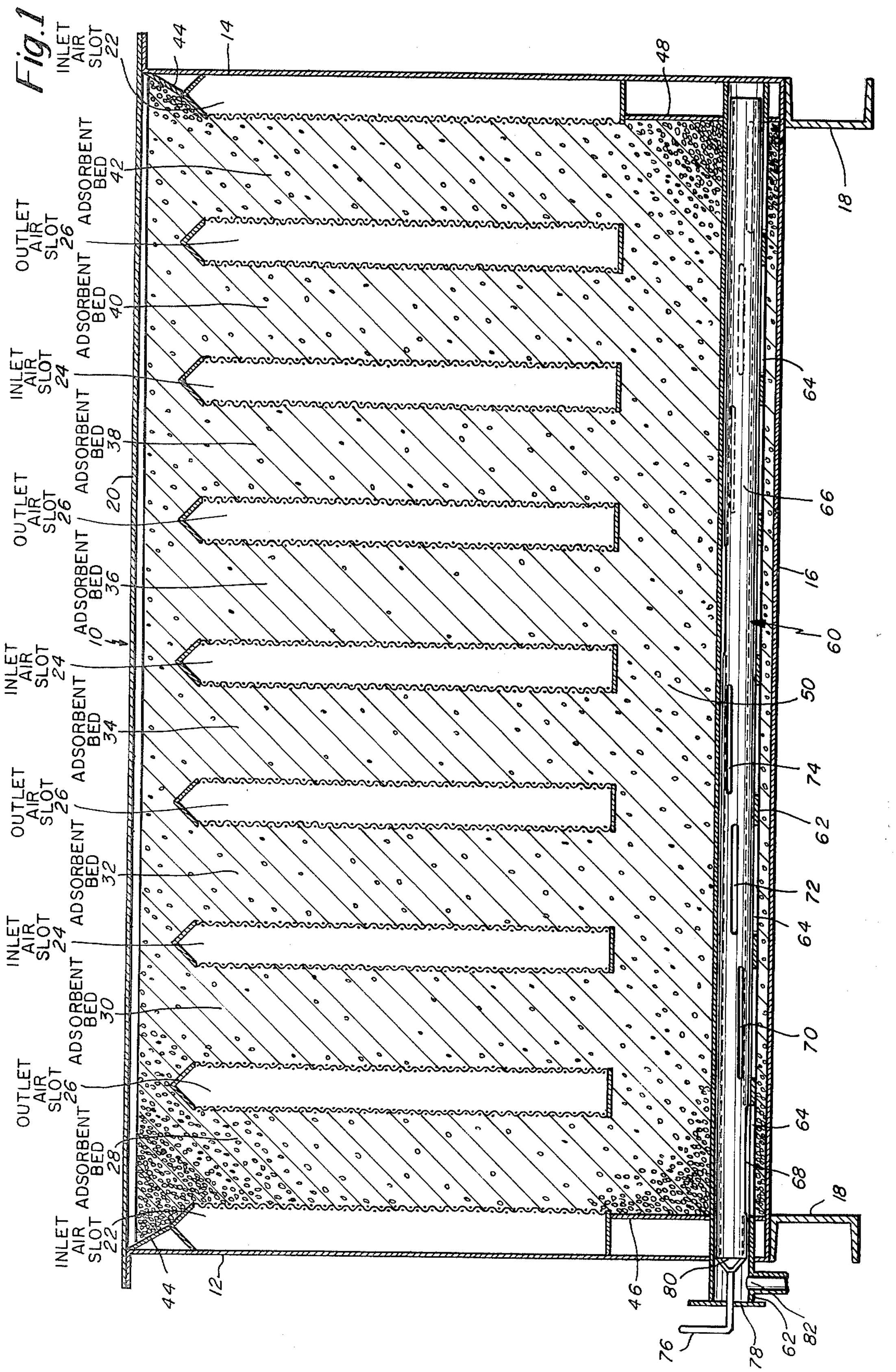
FIG. 1 is a cross-sectional elevational view of a filter apparatus having an improved adsorbent withdrawal system according to this invention.

In FIG. 1, a cross-sectional elevational view of a filter apparatus 10 is presented. This view is taken along a vertical sectional line cutting the withdrawal trough at the bottom of a typical filter apparatus in half.

Filter 10 has an outer housing which is partially formed by side walls 12 and 14 and bottom wall member 16. For purposes of elevating filter 10 off the ground or floor, and for ease of transportation, it is generally mounted on skids 18, as shown. Removable top cover 20 is used to provide a fluid tight seal with the four side walls of filter 10 during filtration and yet cover 20 can be removed when it is desired to add new adsorbent.

Contaminated air to be filtered enters filter 10 through end inlet ducts 22 and center inlet ducts 24. In practice, end inlet ducts 22 and center inlet ducts 24 are connected in parallel to a fluid manifold located outside the outer housing and which delivers contaminated air to filter 10. Fluid outlet ducts 26 serve to deliver filtered fluid to a similar outlet manifold also located externally to filter 10. As is indicated, the inner wall of end inlet ducts 22 and both walls of fluid centered inlet ducts 24 and outlet ducts 26 are formed from a screen or perforated sheet so that fluid can pass therethrough.

A series of adsorber beds 28, 30, 32, 34, 36, 38, 40 and 42 are formed between fluid inlet ducts 22 or 24 and fluid outlet ducts 26. Solid particulate adsorbent, such as granulated charcoal, can be introduced into the beds 28–42 by removing cover 20 and filling the entire interior of filter 10. Baffle plates 44 are positioned within filter 10 to block off spaces where adsorbent could become trapped. Baffle plates 46 and 48 are positioned to block off spaces where adsorbent would serve no useful purpose since there is no significant fluid flow at these spaces.

As can be seen, inlet ducts 22 and 24 and outlet air ducts 26 do not extend completely to the bottom of filter apparatus 10. Thus, there is a common area 50 where spent adsorbent from the beds 28–42 flows, and this common area is typically the upper portion of a withdrawal trough extending along the bottom of the filter beds.

Figure 2:
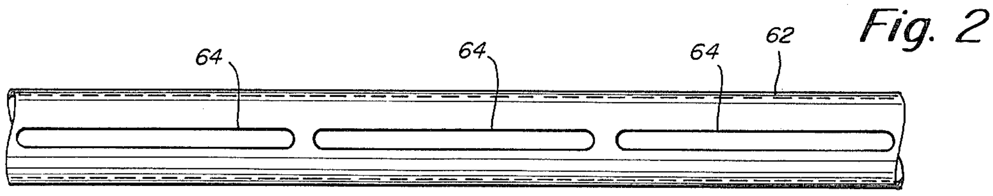
FIG. 2 is a bottom view of a portion of the outer fixed tube for an improved withdrawal system as shown in FIG. 1.

Withdrawal apparatus 60 extends along the bottom of filter apparatus 10 and through common area 50 below the adsorbent beds 28–42. An outer fixed tube 62 extends through side wall member 12 and along the bottom area 50 of filter apparatus 10. At its lower surface, tube 62 has a pattern of elongated slots 64 which are all the same size and which are uniformly spaced in a straight-line relationship. This pattern can be seen more clearly in FIG. 2 which illustrates a bottom view of a portion of fixed outer tube 62.

Figure 3:
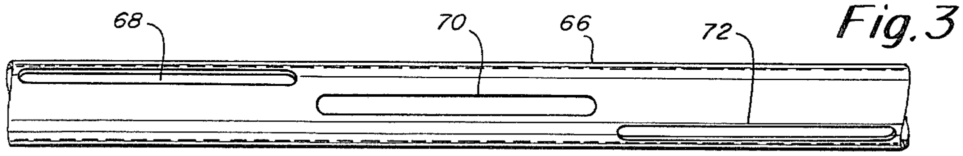
FIG. 3 is a bottom view of a portion of the inner rotatable tube for an improved withdrawal system as shown in FIG. 1.

A concentric rotatable inner tube 66 is positioned inside fixed tube 62 and contains a second pattern of openings, including elongated slots 68, 70, 72 and 74. Elongated slots 68, 70, 72 and 74 are roughly the same size as slots 64, but are positioned in a staggered arrangement along the length of inner tube 66. The pattern of slots on inner rotatable tube 66 can be seen more clearly in FIG. 3.

Handle 76 extends through flange 78 of outer tube 62 and is integrally joined with tip 80 of inner tube 66. A seal, such as a packing gland seal, may be used to provide a fluid tight seal between handle 76 and flange 78.

Figure 4:
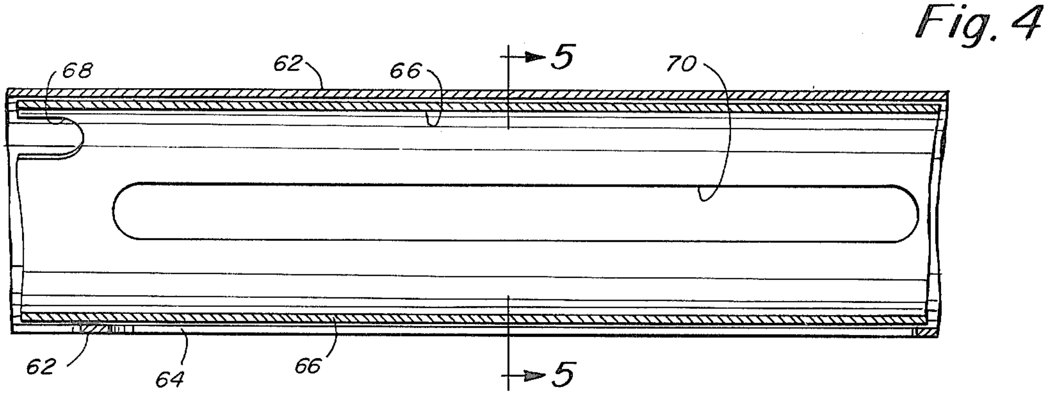
FIG. 4 is a partial cross-sectional elevational view of the two concentric tubes used in the embodiment of an improved adsorbent withdrawal system shown in FIG. 1.
Figure 5:
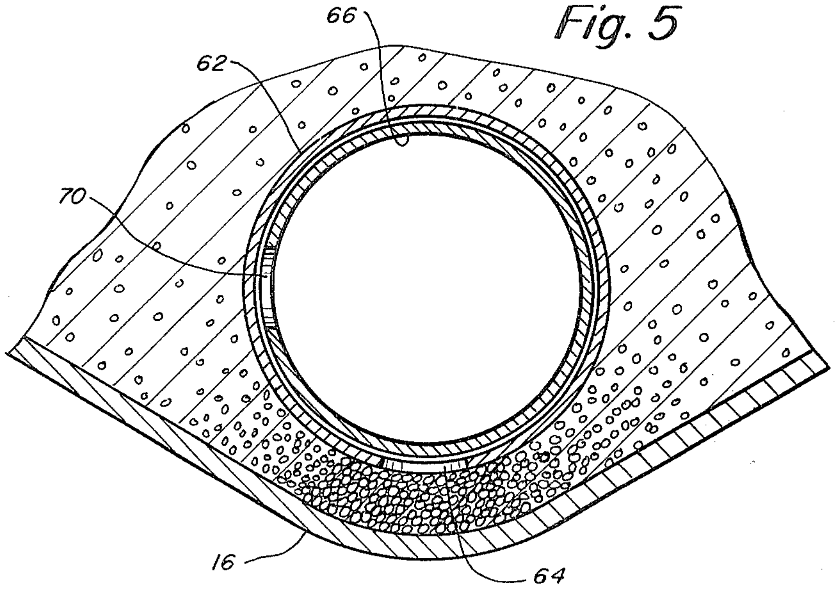
FIG. 5 is a cross-sectional view along the section line 5—5 in FIG. 4.

FIGS. 4 and 5 further illustrate the relationship between fixed tube 62 and rotatable tube 66. Thus, it can be seen that tubes 62 and 66 are concentrically positioned with the minimum practical clearance between the two to minimize fluid leakage from the system. In a typical arrangement, tube 62 might be a stainless steel tube having an outside diameter of 1.625" and a wall thickness of 0.058" whereas inner tube 66 might be a stainless steel tube having an outside diameter of 1.50" and a wall thickness of 0.065". Elongated slot 70 might typically have a length of 5" and a width of 0.38". In general, it is preferred to keep the cross-sectional area of the aligned openings roughly the same or smaller than the cross-sectional area of the inner tube to assure good pneumatic conveyance of spent adsorbent. The particular pattern of slots on tubes 62 and 66, and their dimensions, will depend, of course, on the particular application.

In FIG. 5, it can be seen that inner rotatable tube 66 can be rotated to bring slot 70 into alignment with slot 64 in the bottom of fixed outer tube 62. When this is done, spent adsorbent can be pneumatically conveyed into tube 66.

In operation, inner tube 66 is rotated by handle 76 so that the desired slot alignment is achieved. For example, elongated slot 70 can be brought into alignment with its corresponding elongated slot 64 to empty adsorbent from a zone of filter 10 beneath adsorber bed 30. Spent adsorbent is pneumatically lifted into tube 66 and conveyed out of filter 10 through vacuum connection 82. Similarly, if handle 76 is rotated further, elongated slot 72 can be brought into an aligned relationship with its corresponding elongated slot 64 to remove spent adsorbent from the zone below adsorber bed 32. When this is done, elongated slot 70 is no longer aligned with its corresponding elongated slot 64 so that no further removal occurs in the zone below bed 30. Thus, by continuing to turn handle 76, the entire amount of spent adsorbent can be emptied from filter 10 by the successive alignment of slots in outer fixed tube 62 and inner rotatable tube 66.

Filter 10 operates as follows. Initially, cover 20 is removed and fresh adsorbent is poured into the interior to completely fill beds 28–42. After filter 10 has been filled with adsorbent, removable cover 20 is placed across the top to provide a fluid tight seal. Contaminated air is then introduced through inlet ducts 22 and 24 and the contaminated air flows through the screen walls of inlet ducts 22 and 24 and into the respective adsorbent beds 28–42. Filtered air flows through the screen or perforated sheet of outlet ducts 26 and into an outlet manifold. After a period of time, spent adsorbent can be removed from any zone of filter 10 by rotating inner tube 66, using handle 76, to an appropriate position to align any of its slots with a corresponding slot 64 in outer tube 62. The fluid flow would normally be discontinued during adsorbent removal and replenishment.

Figure 6:
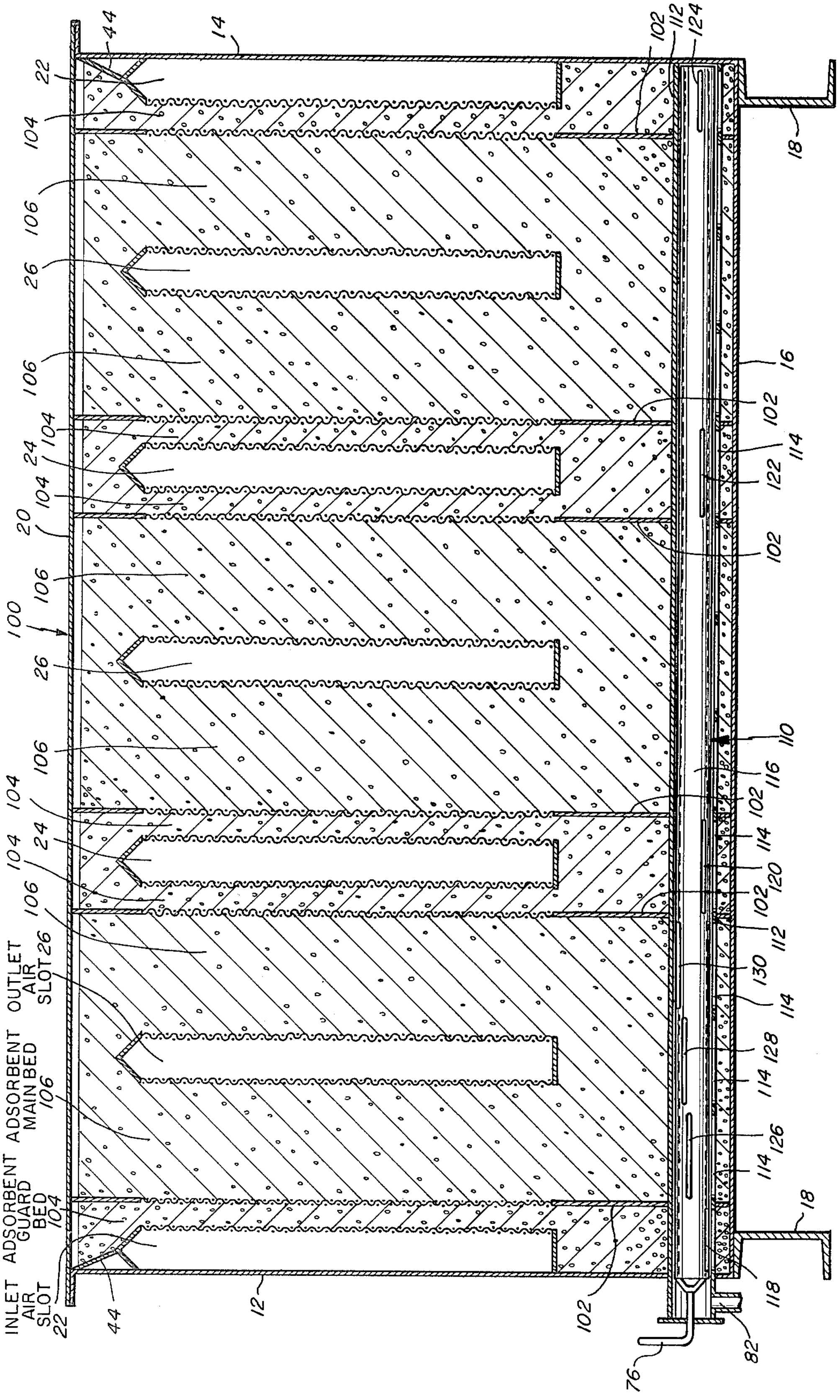
FIG. 6 is a cross-sectional elevational view of a filter apparatus having an alternative embodiment of an improved adsorbent withdrawal system according to this invention; and, FIG. 7 is a cross-sectional elevational view of a filter apparatus having another alternative embodiment of an improved withdrawal system according to this invention.

FIG. 6 illustrates an alternative embodiment of a filter apparatus 100 according to this invention. In FIG. 6, elements which are the same as those shown in the apparatus of FIGS. 1–5 have been given the same numeral and will not be discussed in detail or at all.

Filter 100 contains a series of adsorber bed dividers 102 which have a screened or perforated central portion, thereby allowing fluid to pass therethrough, and non-screen or perforated upper and lower portions. Bed dividers 102 are spaced within filter 100 to provide smaller adsorbent guard beds 104 and adsorbent main beds 106. The purpose of adsorbent guard beds 104 is to remove those contaminants more easily removed, thus allowing the adsorbent main beds 106 to function more efficiently in removing the main contaminant of concern. For example, in nuclear off-gases, adsorbent guard beds 104 might be used to remove contaminants such as paint fumes or other hydrocarbon vapors, whereas adsorbent main beds 106 would be used mainly for adsorbing radioactive iodine or other radioactive contaminants, which are of primary concern.

Spent adsorbent withdrawal system 110 is comprised of outer fixed tube 112, which is provided with a series of elongated slots 114 along its lowermost portion in a straight-line relationship similar to the pattern of tube 62 shown in FIG. 1.

Inner concentric tube 116, which can be rotated by handle 76, is provided with a different pattern of elongated slots. As can be seen, there is a first series of elongated slots 118, 120, 122 and 124, which are separated circumferentially from each other only by small radial distances. As zone selector handle 76 is turned, elongated slots 118, 120, 122 and 124 come into consecutive alignment with their corresponding slots 114 in outer tube 112 so that spent adsorbent in guard beds 104 can be emptied without disturbing adsorbent in the adsorber main beds 106. A second series of elongated slots 126, 128 and 130 are positioned to consecutively align with slots 114 to empty the adsorbent main beds 106 separately from guard beds 104. Use of adsorbent guard beds 104, with withdrawal apparatus capable of independently emptying them, can provide increased efficiency and economy to a filter apparatus, such as filter 100.

Figure 7:
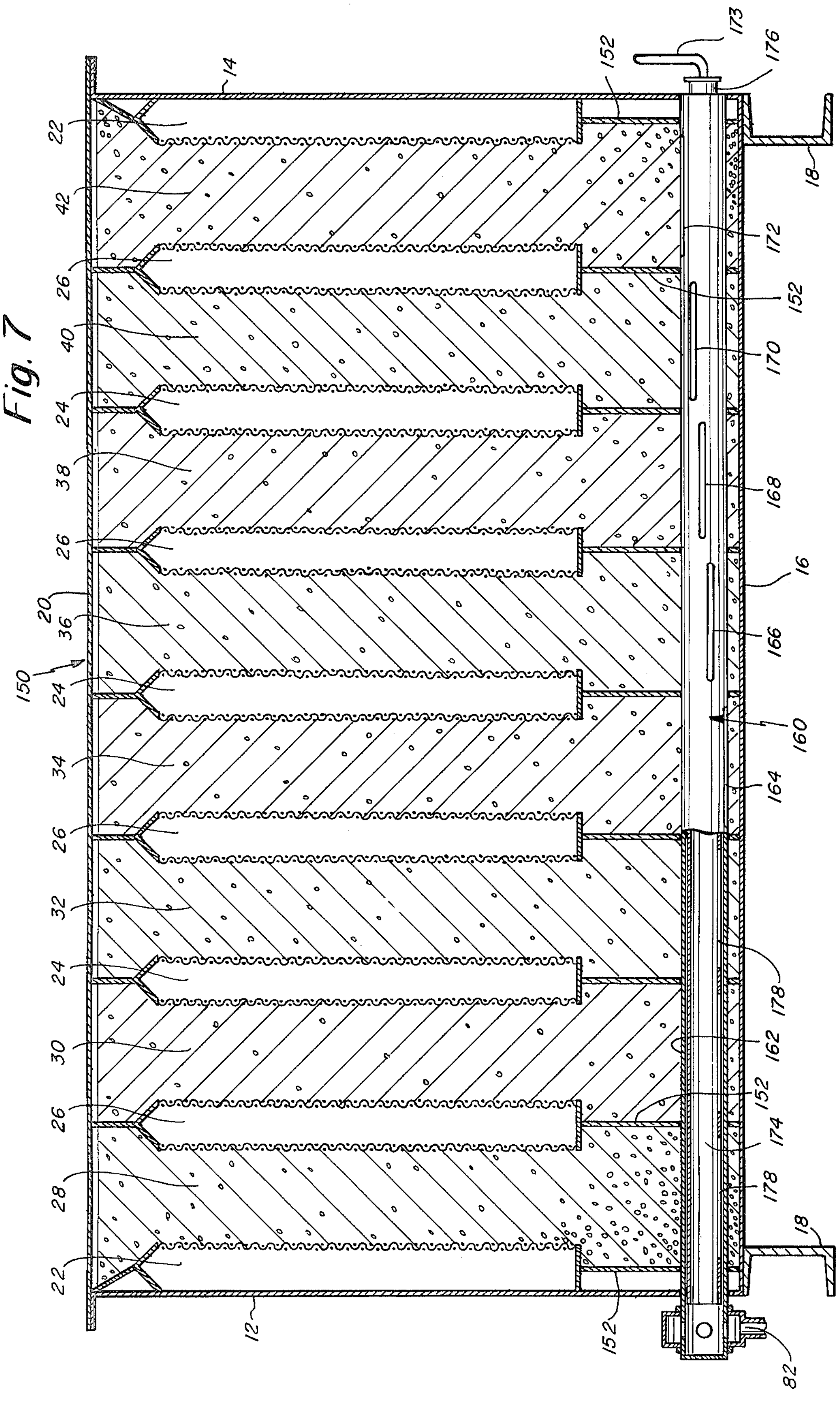

A still further alternative embodiment of a filter apparatus according to this invention is illustrated in FIG. 7. Here again, like numerals refer to like elements. As shown, filter apparatus 150 has a series of bed dividers 152 which extend from the bottom wall member of inlet ducts 22, 24 and outlet flow ducts 26 to the bottom wall 16 of filter 150. In the withdrawal sstem 160 of filter 150, a rotatable outer tube 162 is provided with a series of elongated slots 164, 166, 168, 170 and 172. Outer tube 162 can be externally rotated using zone selector handle 173.

Inner tue 174 is fixed and can be integrally attached to the housing of filter 150 by end flange 176. Inner tube 174 has a pattern of elongated slots 178 in a straight-line relationship similar to the pattern on tube 62 shown in FIGS. 1–5. In operation, filter 150 is similar to those previously shown except that it is the outer tube of the withdrawal system which is rotated.

Spent absorbent can be pneumatically removed from the various zones of filter 150 by turning handle 173 to rotate outer tube 162 to align any of its slots with those of tube 174.

Those skilled in the art will recognize many equivalents to the specific elements and features described herein. Such equivalents are intended to be covered by the following claims.

What is claimed is:

1. In a filter apparatus for adsorptively removing contaminants from a fluid stream, and filter apparatus having a plurality of adsorber beds within an outer housing, said adsorber beds containing solid particulate adsorbent for filtering a contaminant from fluid passed through said beds, the improvement of providing adsorbent withdrawal means comprising:

a. a fixed tube extending through the bottom of said plurality of adsorber beds, said fixed tube having a first pattern of openings therein;

b. a rotatable tube positioned concentrically with said fixed tube and having a second pattern of openings therein, said second pattern of openings being different from said first pattern and being arranged so that only a portion of openings in the second pattern come into alignment with holes in said first pattern for a given position of the rotatable tube whereby adsorbent can be withdrawn through the aligned openings;

c. means for externally rotating said rotatable tube to bring a portion of the holes in said fixed tube and said rotatable tube into alignment whereby adsorbent can be emptied from an adsorber zone located where said holes are aligned; and, d. means for pneumatically conveying adsorbent withdrawn from an adsorber zone into said withdrawal means from said filter apparatus.

2. The improvement of claim 1 wherein said first pattern of openings and said second pattern of openings both comprise patterns of elongated slots.

3. The improvement of claim 2 wherein said rotatable tube is located within said fixed tube.

4. The improvement of claim 2 wherein said fixed tube is located within said rotatable tube.

5. The improvement of claim 1 wherein said filter apparatus is divided into a series of zones by adsorber bed dividers.

6. The improvement of claim 5 wherein said filter apparatus has bed dividers which form adsorbent guard beds and adsorbent main beds.

7. The improvement of claim 6 wherein the first and second pattern of holes on the fixed and rotatable tubes, respectively, are patterns allowing the consecutive emptying of guard beds without emptying the main beds.

8. A method for withdrawing adsorbent from a filter apparatus having a plurality of adsorber beds, said adsorber beds containing solid particulate adsorbent for filtering a contaminant from fluid passed through said beds, comprising:

a. extending a fixed tube through the bottom of said plurality of adsorber beds, said fixed tube having a first pattern of openings therein;

b. positioning a rotatable tube concentrically with said fixed tube, said rotatable tube having a second pattern of openings therein which second pattern is different from said first pattern and is arranged so that a portion of the openings in said second pattern come into alignment with holes in said first pattern for a given position of said rotatable tube;

c. rotating said rotatable tube to bring a portion of holes in said rotatable and fixed tubes into alignment whereby adsorbent can be emptied from an adsorber zone located at said aligned holes; and, d. pneumatically conveying adsorbent from said filter zone through the aligned holes and out of the filter apparatus.

* * * * *